No. 646,616. Patented Apr. 3, 1900.
W. L. ALLEN.
APPARATUS FOR APPLYING COATINGS.
(Application filed Apr. 10, 1899.)
(No Model.) 3 Sheets—Sheet 3.
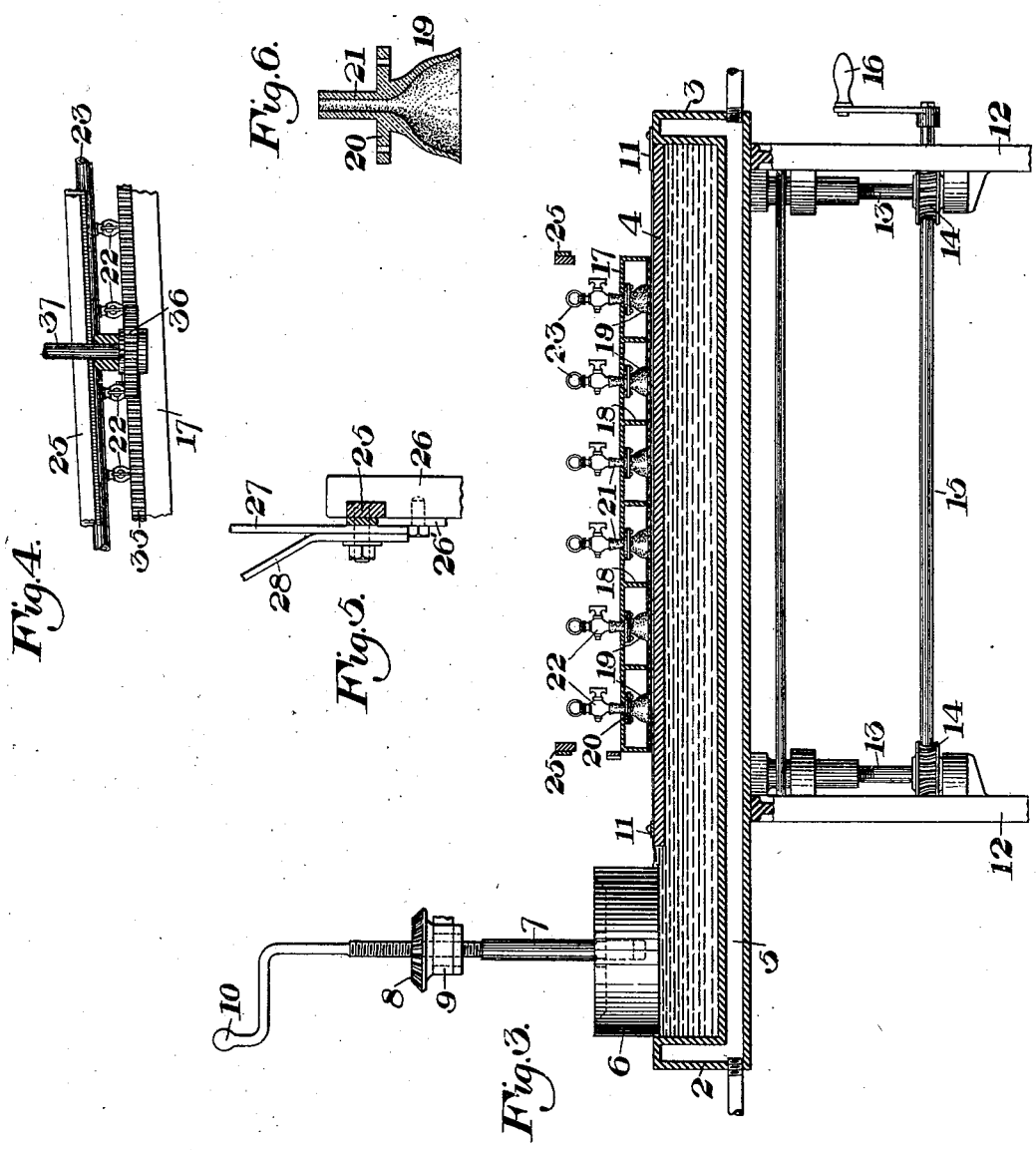
WITNESSES
INVENTOR

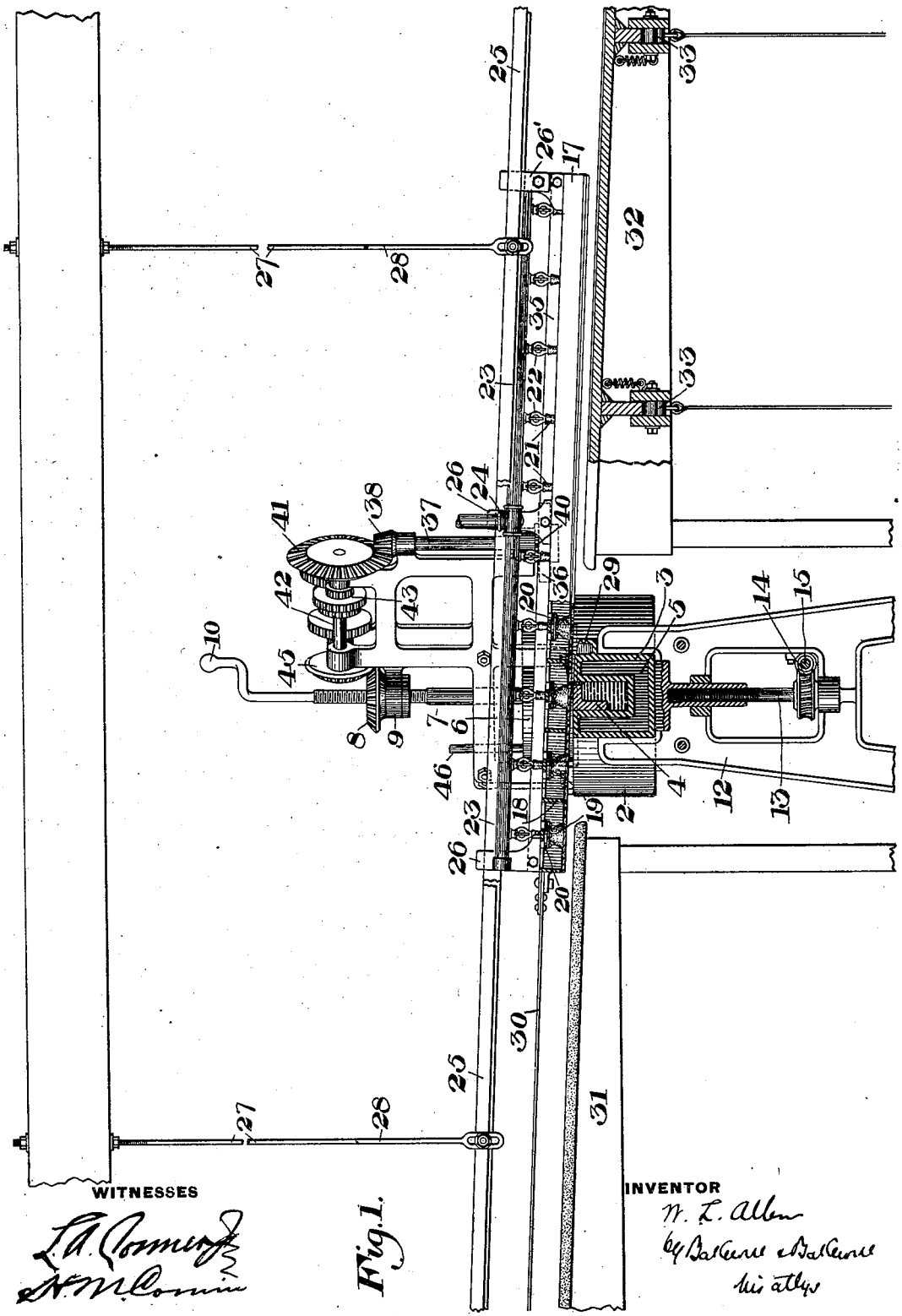

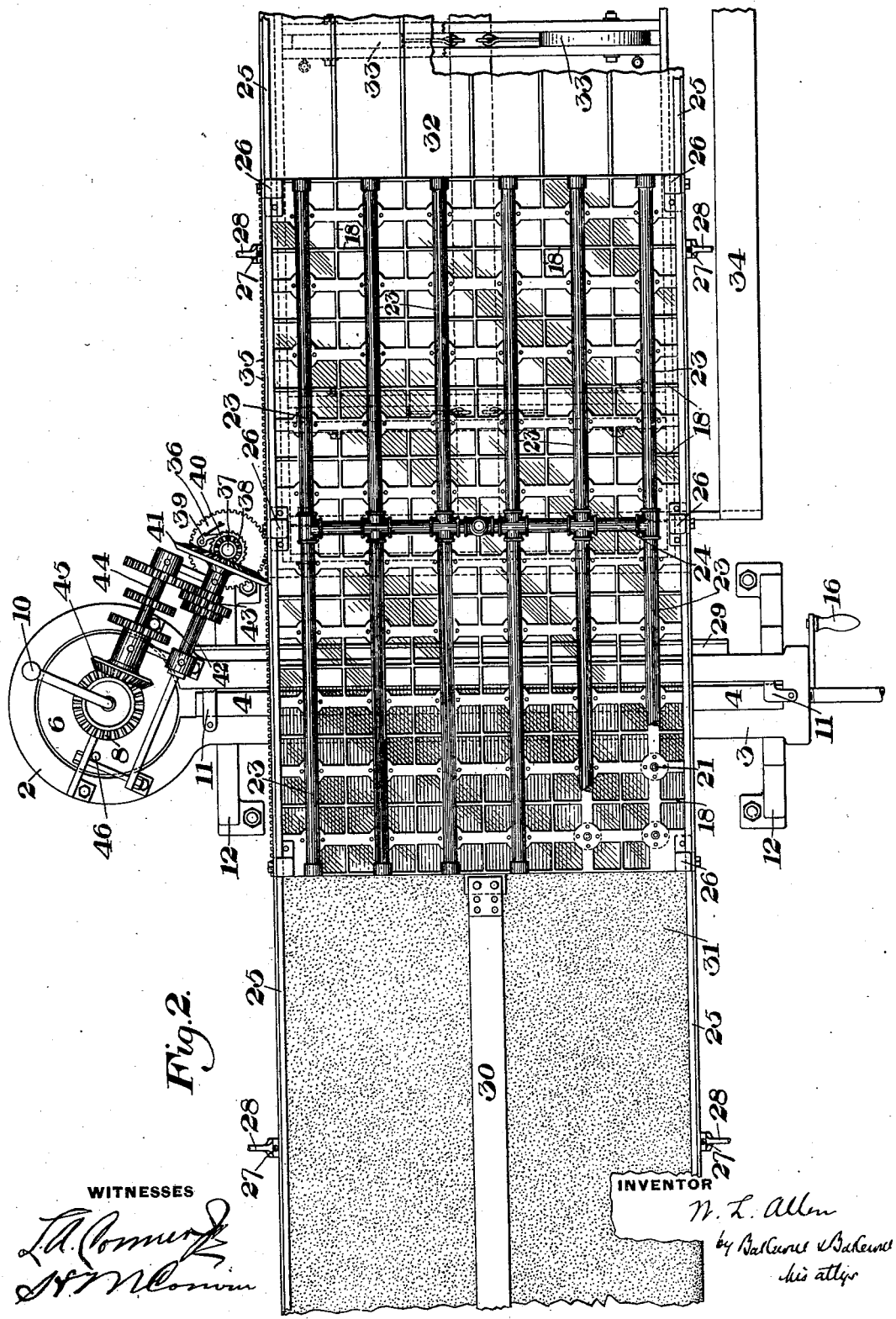

UNITED STATES PATENT OFFICE.

WILL L. ALLEN, OF BUTLER, PENNSYLVANIA, ASSIGNOR OF ONE-HALF TO ELMER G. ELLIOTT AND J. FRANK ELLIOTT, OF EVANS CITY, PENNSYLVANIA.

APPARATUS FOR APPLYING COATINGS.

SPECIFICATION forming part of Letters Patent No. 646,616, dated April 3, 1900.

Application filed April 10, 1899. Serial No. 712,375. (No model.)

*To all whom it may concern:*

Be it known that I, WILL L. ALLEN, of Butler, in the county of Butler and State of Pennsylvania, have invented a new and useful Improvement in Apparatus for Applying Coatings, of which the following is a full, clear, and exact description, reference being had to the accompanying drawings, forming part of this specification, in which—

Figure 1 is a side elevation, partly broken away, of my preferred form of machine. Fig. 2 is a top plan view, partly broken away. Fig. 3 is a cross-sectional view; and Figs. 4, 5, and 6 are enlarged detail views, hereinafter referred to.

My invention relates to apparatus for coating surfaces, and more particularly to the silvering of mirrors, though it may be used for other purposes; and its objects are to provide a simple and effective automatic machine whereby the article to be coated is carried over a slot or opening through which the material is continuously applied, to provide improved means for holding the article thus carried, and, further, to automatically raise the level of the coating-bath as it is used.

In the drawings, 2 represents a pot for the molten amalgam, which at one side is provided with a long horizontal extension 3, having a long slot at its top, which may be partially closed by a float 4, of inverted-L shape, and which leaves a very narrow opening along one edge, through which the molten amalgam is forced upwardly. The pot and its extension are provided with a hollow wall, forming a steam-jacket 5, through which steam is circulated to keep the metal at the desired temperature. A plunger 6 projects into the pot proper and is secured to a stem 7, the upper screw-threaded portion of which engages a corresponding screw-threaded hole in a bevel-wheel 8, carried on the bearing 9. The upper end of the stem is provided with a handle 10, so that the plunger may be moved vertically by hand, if desired, so as to raise or lower the level of the metal in the extension. The float 4 is spaced the desired distance from one edge of the mouth by downwardly-projecting lips upon end brackets 11, thus regulating the width of the slot through which the metal is forced up.

The pot and extension are carried on vertical standards 12, which are provided with suitable guides for the sides of the extension, and the entire pot may be raised and lowered by screw-spindles 13, engaging inwardly-threaded downward extensions of the pot and actuated by worm-gear connection 14 with a shaft 15, which is rotated by handle 16. The pot may thus be brought to the exact level desired and accurately adjusted.

To carry the plate which is to be silvered across the slot, I employ a large metal plate 17, the bottom face of which is provided with a series of depending ribs or flanges 18, which divide it into a large number of separate cells. Centrally placed in each cell is a vacuum-cup 19, of rubber or similar material, whose lower edge is slightly below the lower edge of the ribs. The cup is provided with an annular flange 20 and is secured within the cell by screws passing through a metal ring seated against the flange 20 and entering the body of the plate. The stem 21 of each cup extends through a central hole in the cell-top and is connected by a petcock 22 with one of a series of branch pipes 23, which lead from a main 24, centrally connected to an exhauster or vacuum apparatus, preferably by means of a flexible hose. The carrier thus formed is supported from overhead rails 25 by hangers 26, each containing an outer recess to receive the track-rail and having a securing-plate 26', which engages an outer groove in the rail and prevents detachment. The rails are supported from overhead beams by rods 27, to which the rails are adjustably bolted, as shown in Fig. 1, and are braced by suitable branches 28. (Indicated in Fig. 4.)

As shown in Fig. 1, the track is not horizontal, but is slightly inclined, preferably at about one-half an inch to the foot, the inclination being upward in the direction in which the plate is carried. The purpose of this is that any surplus of coating shall flow along the uncoated portion of the glass and drip into a transversely-extending receptacle 29, as shown in Fig. 1, from whence it runs into a suitable vessel under one end of this inclined receptacle.

The carrier is drawn along the tracks during the coating operation by any suitable connection, such as a strap 30, which extends between two pulleys, one of which is positively driven, while the other may be drawn toward and from it. After the glass has been coated the carrier is moved onto a point over a receiving-table 31, and the vacuum being destroyed the glass is dropped upon a felt or other surface on this receiving-table.

The glass is preferably applied to the carrier by laying the glass on a table, (indicated at 32,) and the carrier being brought over it the top of the table is moved upwardly by any suitable means, such as cam-levers 33, actuated by foot-lever 34, and the glass brought in contact with the cups, upon which the suction is applied, and the plate thus held to the carrier.

In order to automatically force the metal up through the slot as the glass passes over it, I secure to the side of the carrier a rack 35, which engages a pinion 36, which is loose on a short vertical shaft 37, having a bevel-wheel 38 at its upper end. A spring-pressed pawl 39 upon the pinion engages a ratchet-wheel 40, secured to the shaft 37, so that in one direction of rotation the shaft will be rotated by the pinion, while in the other direction the pawl will merely slide over the teeth. The bevel-wheel 38 engages a bevel-wheel 41 on a short horizontal shaft 42, which is connected by a suitable reducing-gear 43 with a shaft 44, having a bevel-wheel 45 engaging the bevel-wheel 8 on the stem 7 of the plunger in the pot. Rotation of the plunger is prevented by a vertical pin 46 thereon, which contacts with the framing on the pot.

The operation is as follows: The pot being supplied with molten metal, preferably an amalgam, which is maintained at the desired temperature, the glass having been applied to the carrier and held thereto by the vacuum-cups, the glass is thus drawn in a slightly-inclined position across the mouth of the pot extension, and the plunger is at the same time slowly depressed, so that the metal will be forced gradually and slowly through the narrow slot and applied to the lower face of the glass plate or sheet. After the sheet has passed the pot the glass is dropped on the receiving-table and the carrier is pulled back to the first table, the pinion 36 running loose on its shaft, and the operations are then repeated. The edges of the flanges or ribs forming the cells are preferably covered with felt or similar material to prevent scratching of the glass.

The advantages of my invention will be apparent to those skilled in the art. A simple and effective carrier for the glass is provided, by which its lower surface is entirely unobstructed. The glass is moreover easily and quickly secured and released. A simple and effective means is provided for continuously forcing the coating material through the slot as it is used upon the surface of the article, this being regulated by the moving of the article over the slot, and the pot is easily and quickly adjusted.

Many changes may be made in the form and arrangement of the parts without departing from my invention, since

I claim—

1. In coating apparatus a receptacle having a slot, mechanism for slowly forcing the material upwardly through the slot, a movable overhead carrier arranged to move over the slot, and vacuum devices upon the carrier arranged to secure the sheet or plate thereto, substantially as described.

2. In coating apparatus, a pot having a longitudinal upper slot, a forcing device arranged to gradually raise the liquid material in the slot, a carrier, mechanism for moving the carrier over the slot and actuating connections between the carrier and the forcing device; substantially as described.

3. In coating apparatus, a pot containing a plunger and having an extension provided with a top slot, a carrier arranged to move a sheet or plate over the slot, mechanism for moving the carrier across the slot and actuating connections between the carrier and the plunger arranged to gradually raise the coating material within the slot; substantially as described.

4. In coating apparatus a receptacle having an upper opening, mechanism for gradually raising the coating material in the opening, a carrier movable across the opening and mechanism on the carrier arranged to secure the plate or sheet thereto in an inclined position, substantially as described.

5. In coating apparatus, a receptacle having an upper slot within which the material is gradually raised and an overhead carrier having depending suction-cups arranged to hold a sheet or plate and mechanism for moving the carrier to carry the sheet or plate over the slot; substantially as described.

6. In coating apparatus, a receptacle having an upper slot, means for gradually forcing the coating material upwardly in the slot, and an overhead carrier having a series of cells, each provided with a depending suction-cup arranged to support and carry the plate, valves controlling the cups and mechanism for moving the carrier over the slot; substantially as described.

7. In coating apparatus a pot containing a plunger and having an extension with a slotted top, an overhead carrier movable over the extension and having suction-cups, and reducing-gear connections between the carrier and the plunger arranged to move the plunger slowly down as the article is carried over the slot; substantially as described.

8. In coating apparatus, a receptacle having an open slot at its top, mechanism for gradually raising the liquid within the slot, a movable carrier arranged to move across the slot and having mechanism arranged to secure a sheet thereto in an inclined position, and a drip-receptacle arranged to receive the surplus from the plate; substantially as described.

9. In coating apparatus, a receptacle having a slotted top, an overhead carrier having suction devices arranged to support a sheet or plate, mechanism for moving the carrier to move the sheet over the slot, a vertically-adjustable table at one side of the receptacle, and mechanism for raising the table to force the sheet into contact with the suction devices; substantially as described.

In testimony whereof I have hereunto set my hand.

WILL L. ALLEN.

Witnesses:
   THOS. B. WHITE,
   ELLA F. WHITE.